July 14, 1925.
R. G. TUGENDHAT
1,545,534
ELECTRICALLY HEATING BAKING OVENS AND THE LIKE
Filed Aug. 1, 1924
5 Sheets-Sheet 2
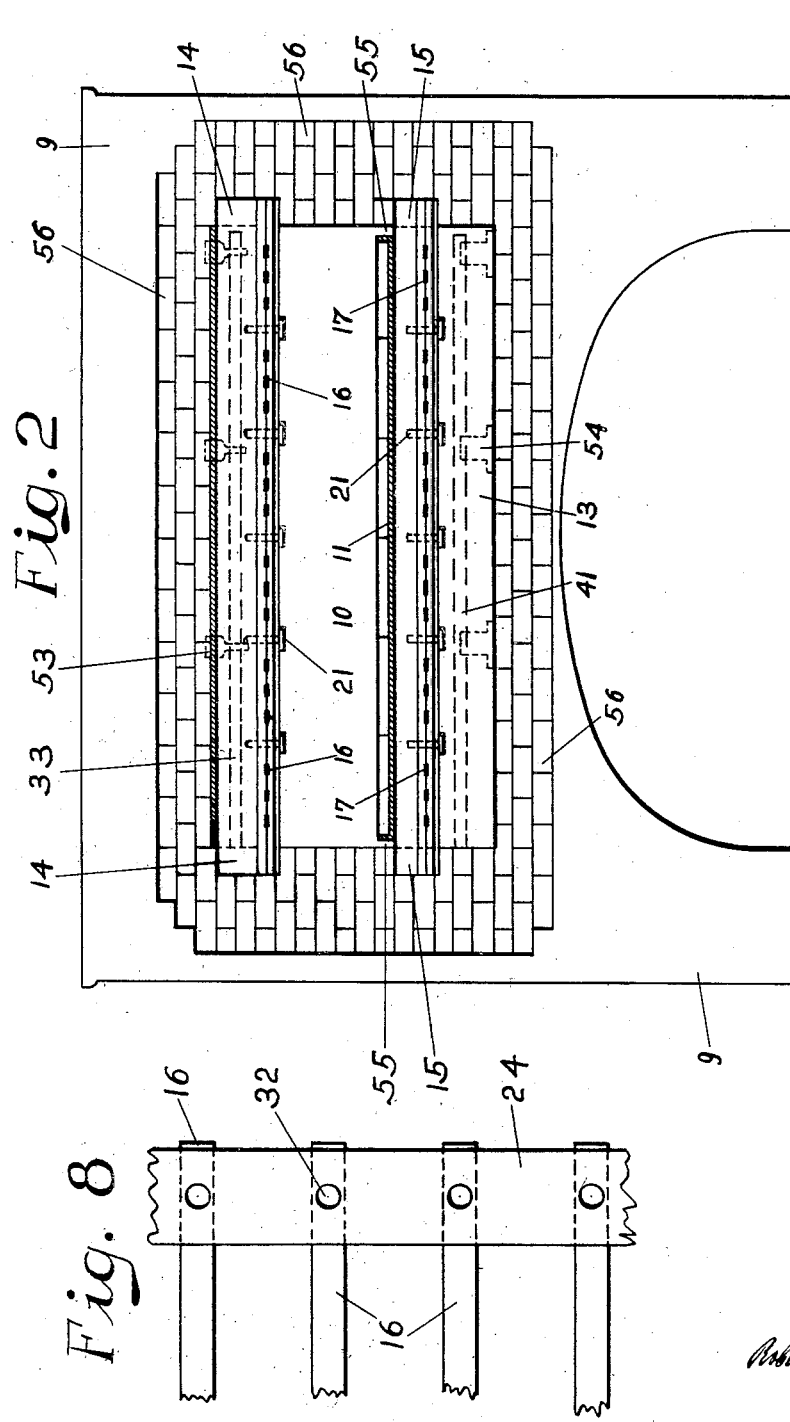
INVENTOR.
Robert George Tugendhat July 14, 1925. 1,545,534
R. G. TUGENDHAT
ELECTRICALLY HEATING BAKING OVENS AND THE LIKE
Filed Aug. 1, 1924 5 Sheets-Sheet 3

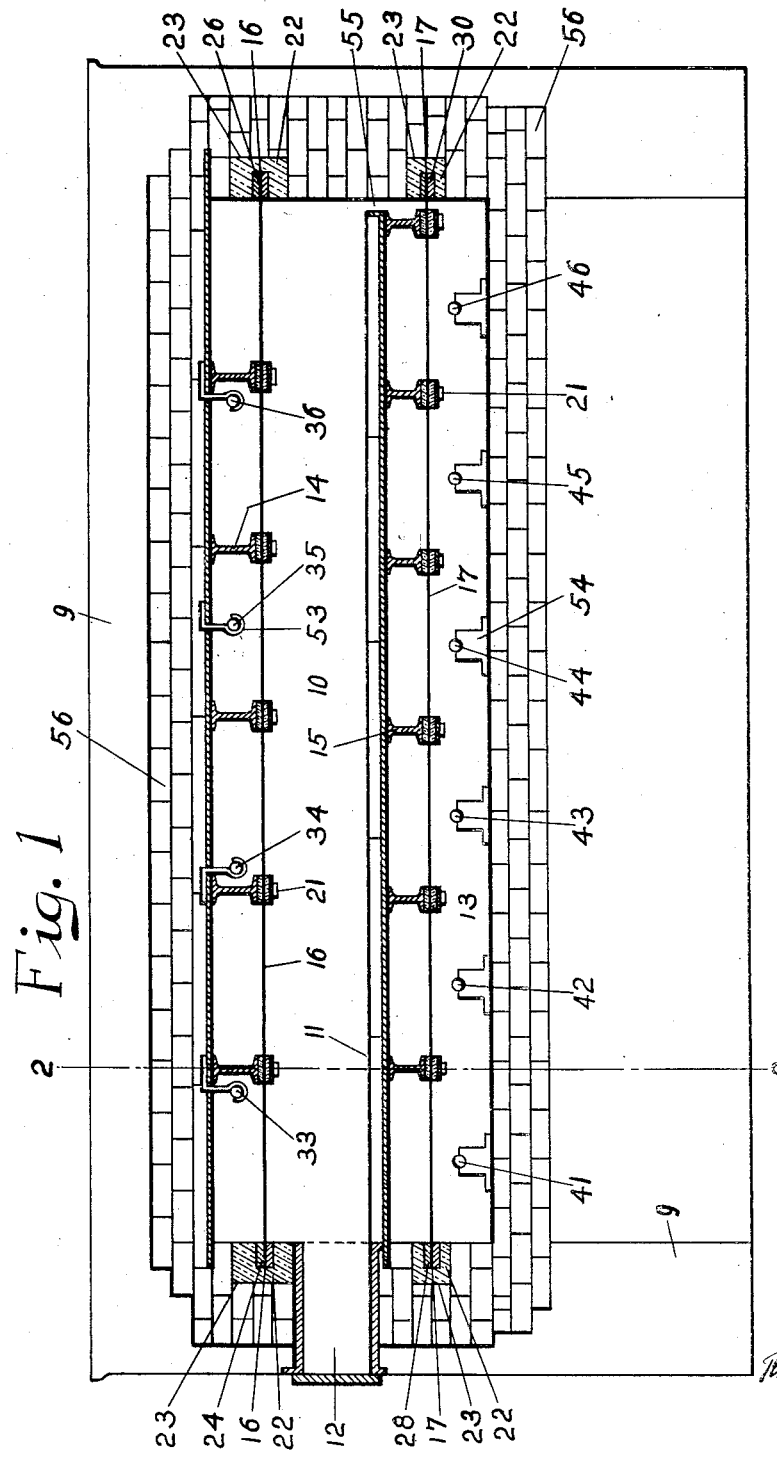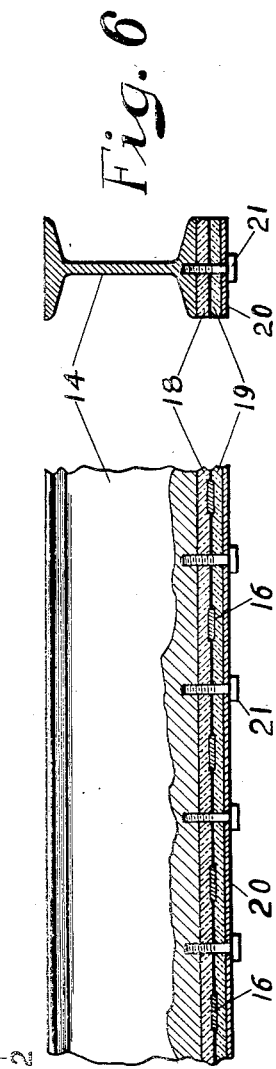

INVENTOR.
Robert George Tugendhat

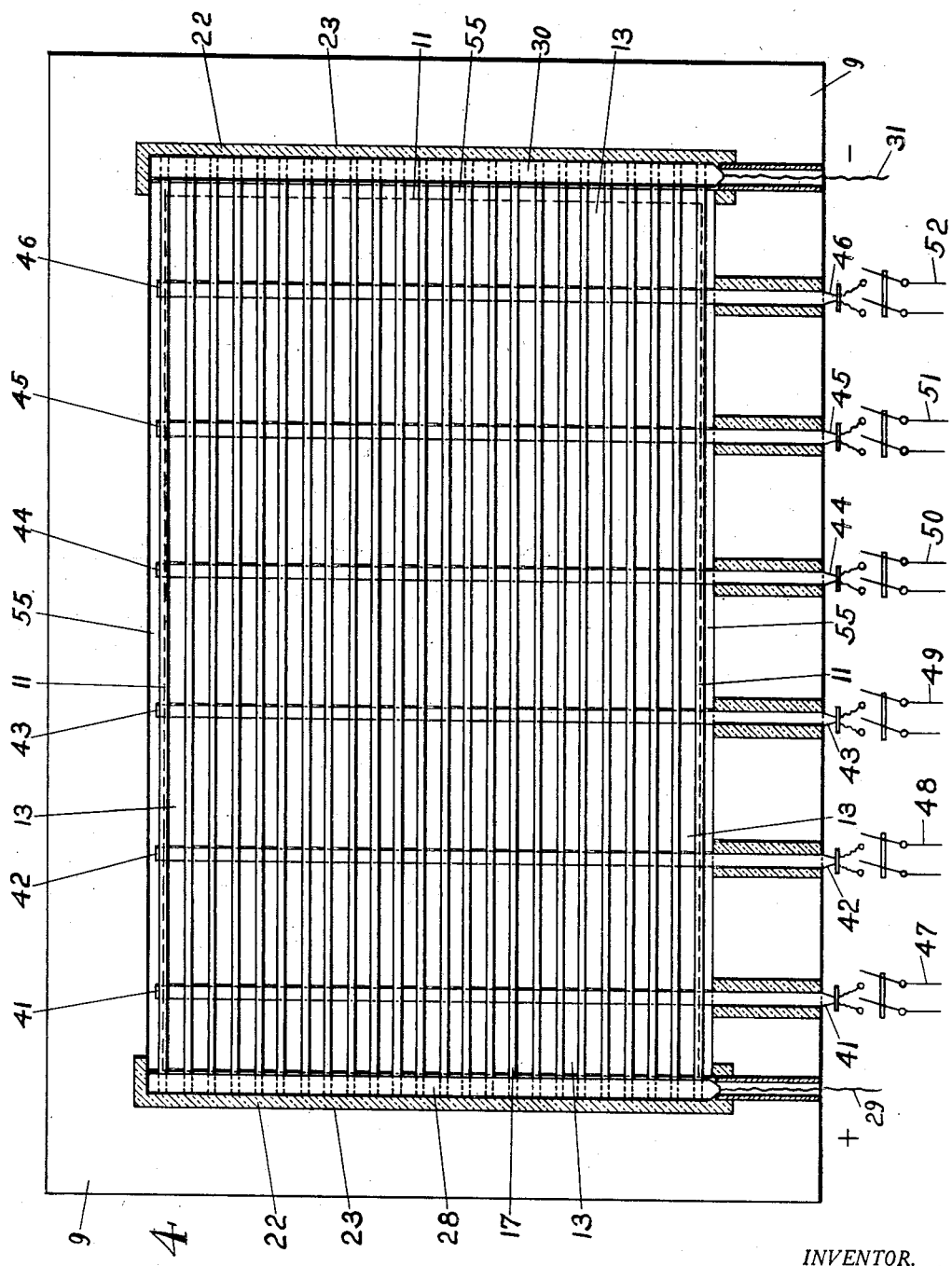

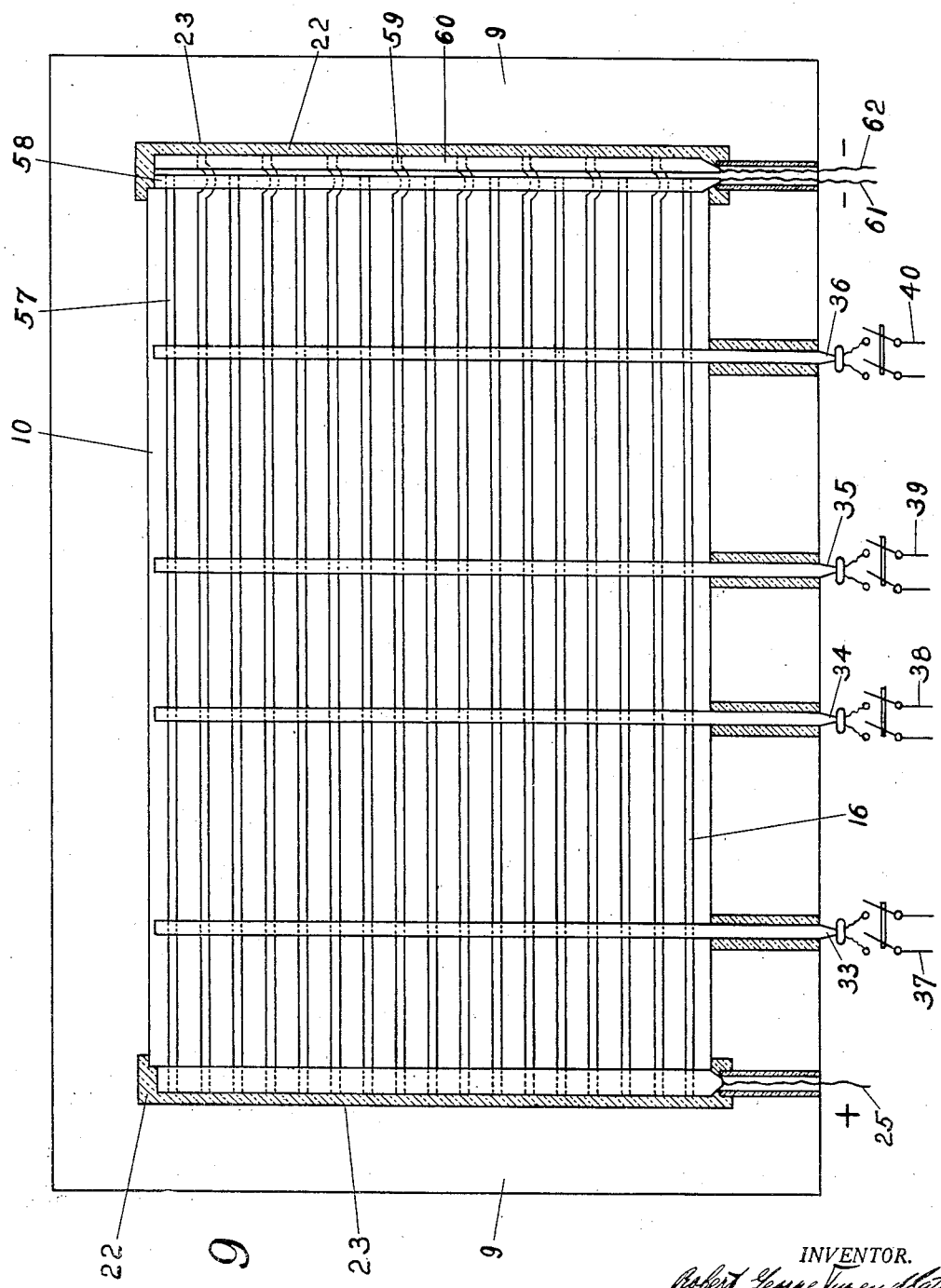

Patented July 14, 1925.

1,545,534

UNITED STATES PATENT OFFICE.

ROBERT GEORGE TUGENDHAT, OF SAGINAW, MICHIGAN, ASSIGNOR TO BAKER-PERKINS COMPANY, INCORPORATED, OF WHITE PLAINS, NEW YORK.

ELECTRICALLY HEATING BAKING OVENS AND THE LIKE.

Application filed August 1, 1924. Serial No. 729,536.

*To all whom it may concern:*

Be it known that I, ROBERT GEORGE TUGENDHAT, a citizen of the Republic of Czechoslovakia, residing at Saginaw, in the county of Saginaw and State of Michigan, have invented new and useful Improvements in Electrically Heating Baking Ovens and the like, of which the following is a specification.

This invention relates to electrically heated baking ovens, varnishing stoves, heating and drying chambers and the like, and has for its object to furnish electrically produced heat to the right amount wanted, increasing or diminishing it at will at the required part in the ovens or the like to be heated, to simplify the construction of the heating apparatus, and to decrease the costs of the whole operation while performing it in the most efficient manner.

To this end, I arrange in the ovens or the like to be heated a main heater extending throughout their whole length and consisting of a plurality of heating elements, preferably ribbon heaters usually arranged parallel to each other and joined at their ends to conductors leading the electric current to the same, and crosswise a suitable number of auxiliary heaters, which may be of any kind, and each of which is preferably separately controlled. The main heater receives during the operation of the oven or the like always that amount of electricity necessary to supply the heat required during the actual heating operation, while the auxiliary heaters are only employed, when the cold oven is to be heated up to the required temperature of the operation, and singly, when and where a larger amount of heat may be desired.

The ribbon heaters forming the main heater consist preferably of nichrome strips, and are fixed at their ends to copper bars, preferably one for each end and common to all, and connected to the electric main.

If the articles to be baked are placed on a baking plate or similar support arranged in the baking chamber of the oven, two sets or rows of longitudinally arranged main heaters, and two of crosswise arranged auxiliary heaters are required, one set of each kind near the ceiling of the baking chamber above the articles to be baked, and the other one near the floor of the baking chamber underneath these articles. In most cases of this kind the numbers of the elements of the upper sets must be greater than those of the elements of the lower sets. The auxiliary heaters are preferably arranged in the upper part of the chamber above, and in its lower part underneath the same.

In order to better equalize the heat emanating from the various electric heaters, the ceiling of the baking chamber, and at least the bottom part of the baking plate, if used, are preferably made of a metal which is a good heat-conductor.

The accompanying drawings, which serve for more minutely explaining the principles of construction, the devices used and their arrangement, which constitute the invention forming the subject of this application, represent a baking oven, in the baking chamber of which the articles are baked on a baking plate, and in which nichrome strips are used for the main heater.

Fig. 1 is a longitudinal section of the oven showing its general construction and the arrangement of the electric heaters and their supports therein.

Fig. 2 represents a vertical section on line 2—2 of Fig. 1.

Fig. 5 and Fig. 6 show the insulation and support of the nichrome strips used as heating elements of the main heater, and Fig. 7 and Fig. 8 their connection to the copper bars joining their ends.

Fig. 9 is a plan of a different type of main heater, in which the nichrome strips are joined at one and the same end alternately to two different copper bars, thus forming two sections, each of which may be separately controlled.

Figure 3:
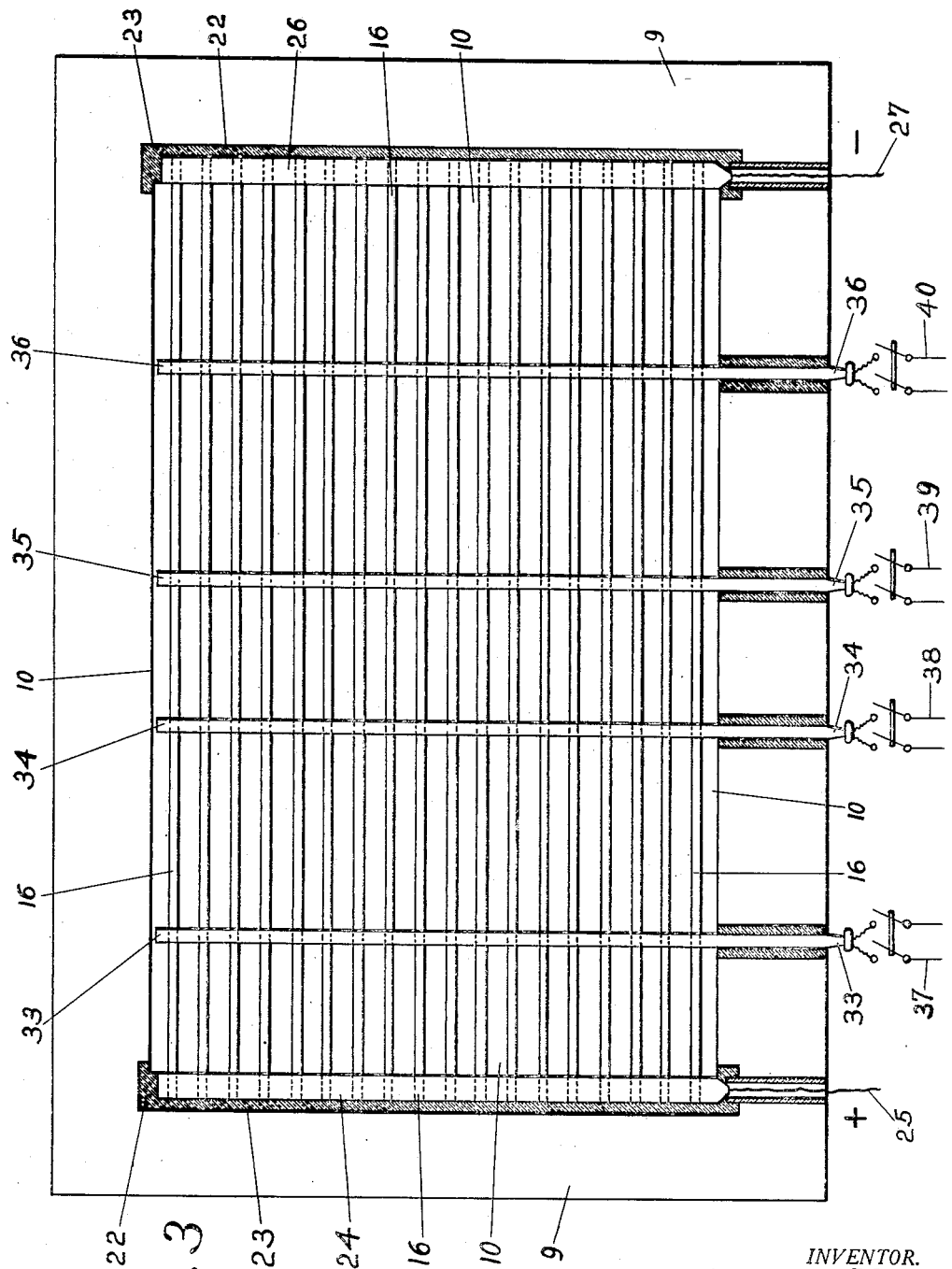
Fig. 3 is a plan of the upper part, and Fig. 4 a plan of the lower part of the heating arrangement of the oven.

In the drawings the numeral 9 indicates the oven, 10 the chamber inclosed therein, in which the articles are baked or heat-treated, 11 the baking plate, on which these articles are placed, 12 the opening and door for charging and discharging the chamber, and 13 the cavity underneath the plate 11 suitably arranged to hold the elements heating the latter. The ceiling of the baking chamber 10 is carried by the girders 14 arranged across and extending into the same, and the baking plate 11 by the somewhat smaller girders 15 arranged across and extending into the cavity 13. The oven shown contains two continuously used main heaters, 16 in the baking chamber 10 and 17 in the cavity 13, the upper one 16 consisting of eighteen, and the lower one 17 of twenty-four nichrome strips of the same width and gauge; in this way a considerably larger amount of heat is supplied by the lower heater 17 than by the upper heater 16, a result which, as will be easily understood, can be obtained in any other suitable way. The single strips are preferably placed parallel to each other and carried by insulators suitably arranged for the upper strips 16 at the supports 14 of the ceiling of the baking chamber 10, and for the lower strips 17 at the supports 15 of the baking plate 11. Figs. 5 and 6 show a very simple construction of this insulated support of the nichrome strips. The latter are placed at regular intervals between two sufficiently thick boards 18 and 19 of insulating material extending the whole width of the chamber 10, about as broad as the bottom flanges of the girders 14 and 15 respectively and fastened to the latter by means of the thin metal plates 20 and the bolts 21. The latter pass through corresponding openings in the boards 18 and 19 and the plate 20 arranged in the interstices between two adjacent strips, and are screwed into the bottom of the girders.

The single ribbon elements receive electricity by being fixed at their ends to copper bars embedded in insulating material 22 contained in suitable recesses 23 left in the end walls of the baking chamber 10, and connected to conductors leading to the source of electricity. In the preferred arrangement shown, the ends of the nichrome strips of the upper main heater 16 are tightly held at one side between the copper bars 24 connected to the conductor 25 leading to the positive pole, and at the opposite side between the copper bars 26 connected to the conductor 27 leading to the negative pole of the source of electricity. The ends of the nichrome strips of the lower main heater 17 are fixed at one side between the copper bars 28 joined to the conductor 29 leading to the positive pole, and at the opposite side between the bars 30 joined to the conductor 31 leading to the negative pole of the source of electricity. Figs. 7 and 8 show, as example of the connection of the nichrome strips to the copper bars, the manner in which the ends of the strips of the main heater 16 are tightly fastened between the bars 24 by means of the screw bolts 32.

The current supplied to the main heater 16 by the conductors 25 and 27, and that to the main heater 17 by the conductors 29 and 31 may be controlled each by a separate switch, or the corresponding conductors 25 and 29, and 27 and 31 respectively, may be joined, and then the two main heaters controlled by only one single switch.

If it is desired to energize only a part of the main heater at a time, or to control the heat in different sections of the same in a different way, the single nichrome strips are connected at their ends to as many different copper bars as is necessary. In Fig. 9 an example of such an arrangement is given. Those ends of the nichrome strips of the main heater 16, all of which are connected in Fig. 3 to the single copper bar 26 joined to the conductor 27 leading to the negative pole of the source of electricity, are here alternately connected to two separate copper bars, the strips 57 to the bar 58, and the strips 59 to the bar 60. The bars 58 and 60 are joined to the conductors 61 and 62 respectively leading to the same pole. The main heater is thus divided into two sections each of which may be controlled by its own switch, which makes it possible to regulate the heat in the baking chamber 10 within very wide limits.

The auxiliary heaters extending across the baking chamber 10 consist of electric heating elements of any suitable type, preferably tube-shaped; also gas heating tubes may be used instead. In the upper part of the baking chamber 10 above the baking plate 11 four auxiliary heaters 33, 34, 35 and 36 are arranged and controlled by the switches 37, 38, 39 and 40 respectively, and in the lower part, the cavity 13 below the baking plate 11, six auxiliary heaters 41, 42, 43, 44, 45 and 46 are located and controlled by the switches 47, 48, 49, 50, 51 and 52 respectively.

The upper set of auxiliary heaters located above the upper main ribbon heater 16, is suspended from the ceiling by hooks of brackets 53, and the lower set, located underneath the lower main ribbon heater 17, is supported on suitably shaped blocks 54 preferably made of refractory material and resting on the floor of the cavity 13. The amount of electricity regularly introduced into the main heaters 16 and 17 is such that the baking chamber, after having been heated up to the required baking temperature, receives therefrom the right amount of heat to bake the articles under ordinary circumstances. The auxiliary heaters are only used for accelerating the heating up of the cold baking chamber to baking temperature, and during the baking operation separately, when and where a larger supply of heat is required.

In order to circulate the heated atmosphere between the baking chamber above the plate 11 and the cavity 13 underneath the same, a suitable space 55 is left open between the edges of the plate 11 and the side walls of the baking chamber 10 with exception in that part of the plate extending to the door opening 12.

For more equally distributing the heat supplied by the electric elements, the ceiling of the baking chamber 10 and the plate carrying the refractory bricks, which both together form the baking plate 11, are preferably constructed of a good heat-conductor, usually iron. The baking chamber 10 and cavity 13 are surrounded in the usual way by heat-retaining and heat insulating bricks 56.

I claim:

1. In heating baking ovens and the like, the combination with a chamber enclosed therein for the material to be treated, of two recesses, one contained in each of the end walls of the said chamber, of a main heater consisting of a plurality of electric heating elements extending through the whole length of the said chamber into the said recesses, of conductors located in the latter, joining the ends of the electric elements of the said main heater and adapted to lead the electric current to the same, and of a number of auxiliary heaters extending across the said main heater through the whole width of the said chamber.

2. In heating baking ovens and the like, the combination with a chamber enclosed therein for the material to be treated, of two recesses, one contained in each of the end walls of the said chamber of a main heater adapted to supply all the heat required under normal circumstances and consisting of a plurality of electric heating elements extending through the whole length of the said chamber into the said recesses, of conductors located in the latter, joining the ends of the electric elements of the said main heater and adapted to lead the electric current to the same, of a single switch controlling the current entering the conductors, and of a number of auxiliary heaters extending across the said main heater through the whole width of said chamber.

3. In a baking oven and the like, the combination with a chamber enclosed therein for the material to be treated, of a main heater consisting of a plurality of electrical heating elements extending through the whole length of the said chamber, and joined together at their ends in sections to conductors leading the current to each section so that the same may be separately controlled, and a number of auxiliary heaters extending across the said chamber.

4. In heating baking ovens and the like, the combination with a chamber enclosed therein for the material to be treated, of a main heater adapted to supply all the heat required under normal circumstances and consisting of a plurality of electric heating elements extending through the whole length of the said chamber and joined together at their ends by conductors leading the electric current to the same, and of a number of auxiliary heaters extending across the said main heater throughout the whole width of the said chamber and evenly distributed over its length, each of the said auxiliary heaters being separately controlled so as to be able to supply heat at any part, when it may be required.

5. In heating baking ovens and the like, the combination with a chamber enclosed therein for the material to be treated, of two recesses, one in each end wall of the said chamber along its inner side, of a main heater consisting of a plurality of electrical ribbon elements extending through the whole length of the said chamber into the said recesses, of two conductor bars located in the said recesses, joining the ends of the elements of the said main heater, and adapted to supply the electric current to the latter, and of a number of auxiliary heaters extending across the said chamber.

6. In heating baking ovens and the like, the combination with a chamber contained therein for the material to be treated, of a main heater consisting of a plurality of nichrome strips extending through the whole length of the said chamber about parallel to the side walls thereof, and joined together at their ends by conductors leading the electric current to the same, and of a number of auxiliary heaters extending across the said chamber.

7. In heating baking ovens and the like, the combination with a chamber enclosed therein for the material to be treated, of two sets of main heaters, each consisting of a plurality of electrical heating elements and extending through the whole length of the said chamber, one near the ceiling and the other one near the floor thereof, the elements of each set of the said main heaters being joined together at their ends by conductors leading the electric current to the same, and of two sets of auxiliary heaters extending across the said chamber, one near the ceiling and the other one near the floor thereof.

8. In heating baking ovens and the like, the combination with a chamber enclosed therein for the material to be treated, of two sets of main heaters each consisting of a plurality of electrical heating elements, and extending through the whole length of the said chamber, one near the ceiling and the other one near the floor thereof, the elements of each set of the said main heaters being joined together at their ends by conductors leading the electric current to the same, and two sets of single auxiliary heaters, extending across the said chamber, one above the said main heater arranged near the ceiling and the other one underneath the said main heater arranged near the floor of the said chamber.

9. In heating baking ovens and the like, the combination with a chamber enclosed therein for the material to be treated, of a ceiling for the same, made of a good heat-conducting metal, of a main heater consisting of a plurality of electric heating elements extending through the whole length of the said chamber, and arranged closely to the said metal ceiling for the latter to assist in equalizing the heat emanating from the single heating elements, of conductors joining the ends of the latter and leading the electric current to the same, and of a number of auxiliary heaters extending across the said main heater through the whole width of the said chamber.

10. In heating baking ovens and the like, the combination with a chamber enclosed therein, of a baking plate arranged in the said chamber for holding the material to be treated and having a bottom made of a good heat-conducting metal, of a main heater consisting of a plurality of electric heating elements extending through the whole length of the said chamber and arranged closely underneath the metal bottom of the said baking plate for the latter to assist in equalizing the heat emanating from the single heating elements, of conductors joining the ends of the latter and leading the electric current to the same, and of a number of auxiliary heaters extending across the said main heater through the whole width of the said chamber.

11. In heating backing ovens and the like, the combination with a chamber enclosed therein for the material to be treated, a main heater consisting of electric ribbon elements extending parallel to each other throughout the whole length of the said chamber, of conductors joining the ends of said ribbon elements and leading the electric current to the same, of a number of girders arranged as supports across the said chamber, and of strips of insulating board, two for each of the said girders, being as broad as the flanges of the latter and as long as the said chamber is wide, the said ribbon elements being stretched between the successive pair of the said insulating strips fixed to corresponding flanges of the said girders by means of washer plates and screw bolts passing through corresponding openings arranged in these washer plates and the said insulating strips between two of the said elements so as not to touch the latter.

ROBERT GEORGE TUGENDHAT.